Figure 1:
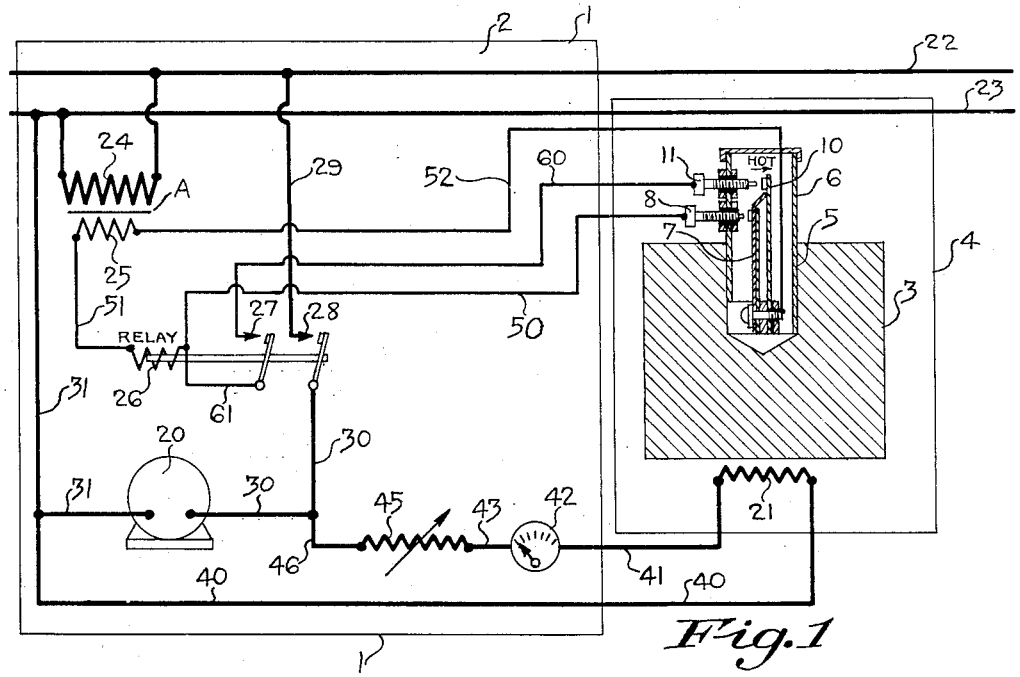

Feb. 7, 1939.  D. G. TAYLOR  2,146,604
THERMOSTATIC CONTROLLED DEVICE
Original Filed Feb. 2, 1931

Inventor
Daniel G. Taylor
By George H Fisher
Attorney

Patented Feb. 7, 1939

2,146,604

UNITED STATES PATENT OFFICE

2,146,604

THERMOSTATIC CONTROLLED DEVICE

Daniel G. Taylor, Minneapolis, Minn., assignor to Minneapolis-Honeywell Regulator Company, Minneapolis, Minn., a corporation of Delaware Original application February 2, 1931, Serial No. 512,887, now Patent No. 2,065,835, dated December 29, 1936. Divided and this application November 27, 1936, Serial No. 112,915

13 Claims. (Cl. 200—138)

This invention relates to methods and means for controlling heating plants, directly in conformity to outdoor atmospheric conditions, to the end that the proper temperature level may be maintained within doors, even though the heat loss from the building may be increased due to wind. Heretofore it has been common practice to attempt to maintain the proper indoor temperature either by means of thermostatic elements located in the rooms, or by means of one such element located indoors and another outdoors, with the arrangement such, for example, that for each degree of drop of outdoor temperature, the temperature of the heating medium is raised one degree. The principal disadvantage of this system is that it cannot respond to an increased heat loss due to wind. For example: Using an ordinary thermal device, such as a thermometer, located outdoors, and with a temperature of say 20° below zero, the thermometer registers that temperature whether the wind is or is not blowing.

It is, therefore, an object of this invention to provide a thermostatic device for controlling the heat supply in the building, and to arrange it to be affected by atmospheric conditions outside of the space to be heated. Such a device will accurately respond to the additional heat loss within the house, due to wind, and will also respond to all other temperature variations due, for example, to sunshine, shadow, etc.

A further object of this invention is to provide a temperature responsive means the operation of which is modified in response to wind velocity.

Another object of this invention is to provide temperature responsive means the operation of which is modified in response to wind velocity and in response to the heat of the sun's rays.

The present system also has the advantage of placement of the thermal control means at a position where it cannot be conveniently tampered with by the occupants of the building, or enclosed space to be heated. Moreover, where thermostats are located in any room or in any space to be heated, the tenant may open the window, and cool the room or space sufficiently to start the heating plant and supply heat to other apartments or spaces when it is not needed. This latter contingency occurs where a single heating plant supplies a number of apartments and where the thermostat in each apartment is adapted to control the heating plant.

This application is a division of my co-pending application Serial No. 512,887 filed February 2, 1931, now Patent No. 2,065,835, December 29, 1936.

Objects, features and advantages of the invention will be set forth in the description of the drawing forming a part of this application, and in said drawing.

Figure 1 diagrammatically illustrates one application of the invention; and

Figure 2:
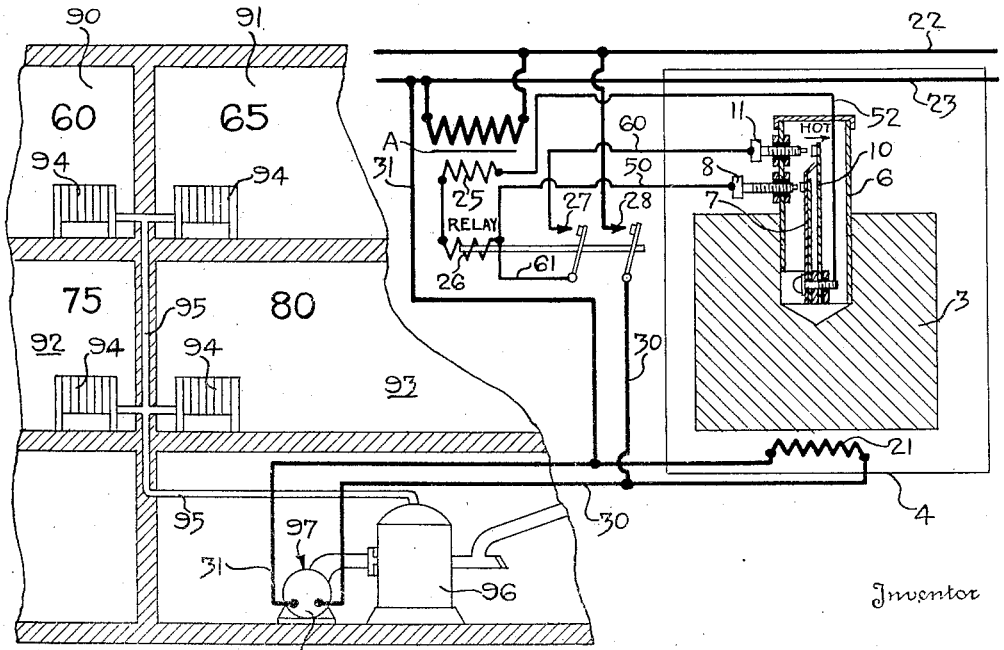

Figure 2 diagrammatically illustrates the invention applied for controlling the temperature in a plurality of compartments in proportion to the average of the heat losses therefrom.

The numeral 1 indicates the wall of any enclosed space 2 to be heated, such as a house or room. Thermal means is arranged to be affected by atmospheric conditions outside the space 2. In this instance, the thermal means includes the metal block 3, upon which a thermostatic switch is mounted. This device is suitably protectingly housed by a casing 4 which, however, does not prevent proper atmospheric action upon the metal block. For example, it does not prevent moving air from affecting the block to cause additional heat loss therefrom.

The top of the block is provided with a socket 5 into which is fitted a metal tube 6, which tube projects upwardly beyond the block as shown. Within the tube is arranged a bimetallic thermostatic element 7 adapted, when cooling and moving to the left, to first make electrical contact with a binding post 8, adjustably supported by the wall of the tube 6. It will be assumed, for illustrative purposes, that the thermostatic element 7 will make contact with the element 8 when block temperature is 60° F. Associated with the bimetallic element and operable thereby is a second contact element 10 cooperable with a binding post 11, also adjustably supported in the tube wall. In this instance, the element 10, or holding contact, is first to close. It may be assumed that after the element 10 has made contact with the binding post 11, it will only move to open its circuit at a block temperature of 80°.

Numeral 20 indicates the burner motor, or equivalent control device, of a heating plant, which plant is to be controlled in conformity to temperature conditions at the block. An electrically operable heating element 21 is associated with the block. Any suitable means may be employed for this purpose, but any electrically operable heating means is convenient, for one reason because the heat in-put can be accurately adjusted. This is generally inserted in a cavity of the block. The grid or heating element 21 is so placed that the thermostatic element will respond rather to the block temperature than directly to grid temperature. The numerals 22—23 respectively indicate the hot and ground sides of a suitable electric power source. Connected across the line is the primary 24 of a transformer A, the secondary of which is indicated at 25. A relay is used for controlling the burner, the coil of which relay is shown at 26. This relay controls contacts 27—28 respectively a holding contact, in circuit with elements 10—11, and a motor control contact. The contact 28 is connected by conductor 29 with the hot side 22 of the line, the opposite side of the contact being connected by conductor 30 with one terminal of the motor, and the other terminal of the motor being connected by conductor 31 with the ground side 23 of the power line. Obviously, when the contact 28 is closed, the motor will be energized. Although it has not been shown, it will be understood that the usual apparatus for producing and maintaining flame is provided, and it will be further understood that while the motor is operating, heat will be supplied to the indoor space or spaces to be heated. One electrical heating element or coil 21 is connected with the conductor 31 by conductor 40. The other side of the heating element is connected by conductor 41 to one side of an ammeter 42, the other side of the ammeter being connected by conductor 43 with one terminal of a variable resistor schematically indicated at 45. The opposite terminal of the resistor is connected to conductor 30 by conductor 46. The arrangement is, therefore, in this instance, such that when the contact 28 is closed, the heating element is energized at the same time as the motor. By use of the variable resistor, the degree of heating may be regulated, and the degree of regulation is indicated by the ammeter.

In this case, it has been assumed that the motor is to be energized and heat is to be supplied when the temperature of the thermal element 7 reaches 60° F. To this end, the adjustable binding post or contact 8 is connected by conductor 50 with one terminal of the relay coil 26, the other terminal of the coil being connected by conductor 51 with one side of the secondary 25. The opposite side of the secondary is connected by conductor 52 with one terminal of the thermostatic element 7. It is obvious that when 7 makes at 8, the relay will be energized. In order to stop the motor at a temperature of 80° F. (the assumed illustrative temperature level), as controlled by the thermal element 7, a holding circuit is provided, and includes a conductor 60 connecting the adjustable binding post 11 with the contact 27, the other side of the contact being connected by a conductor 61 to the same terminal of the relay coil 26 to which the conductor 50 is connected. The resistor is in series with the heating element.

The thermostat 7 is to maintain the same average temperature in the block, as that to be maintained indoors. The heat loss from the block increases or decreases in direct proportion to the heat loss from the space, the temperature of which is being controlled. It is possible by manipulating the resistor 45 to so adjust the heat in-put to the block that the house will be maintained at a definite temperature (or that the heating plant will be operated in a definite way), no matter what the variations in outdoor temperature may be. It is obvious that with a given heat in-put to the block, a corresponding effect will be transferred to the thermostatic element 7. The amount of this in-put will remain constant, as long as the atmospheric conditions remain the same. However, in case of wind, additional heat loss would occur which would result in more quickly lowering the temperature of the thermal element 7 with the result that it would more quickly make contact, with the element 8 to initiate earlier operation of the fuel supply apparatus. If, however, with that given heat in-put the outside temperature should rise, due to heating effects of the sun, the block would receive more outside heat, that heat would be added to the heat supplied by the element 21, and the thermostatic element 10 would more quickly move away from the element 11 and, therefore, the period of burner apparatus operation would be reduced.

Thus the burner is under the sole command of an outside thermal means which is adjustable. In case of a sharp drop at night, as from 60° to 50°, in a comparatively short length of time, the outside thermostat starts the heating apparatus before the house begins to cool, and thus anticipates the demand of heat by the house, inasmuch as the house is more slowly responding to the outside temperature drop than the thermostat. Although the house may begin to slowly cool, the heat in the heating plant is being built up so that long before the enclosure can assume the outside temperature or be unduly cooled, the radiators are hot enough to increase the house temperature conformably to the outside temperature drop.

In order to obtain the proper functioning of the present device, the average temperature of the block should be the same as the average temperature of the house. In this device, the average heat loss of the block should be proportional to the difference between the temperature of the block and the outside temperature. The device is readily adjustable to obtain the desired result.

The important feature of the invention is the arrangement whereby the thermostat or equivalent device is set to maintain the same average temperature in the block as that to be maintained in the space to be heated, so that the heat loss from the block increases or decreases directly in proportion to the heat loss from the space heated.

Figure 2 diagrammatically represents a vertical section through a building showing a plurality of rooms or spaces to be heated. These spaces are respectively indicated 90, 91, 92 and 93. Each of these spaces is provided with one or more radiators, each designated by the numeral 94. These radiators have a single supply and return pipe indicated at 95, the steam to which pipe is provided by a boiler or other suitable apparatus indicated at 96. The heat is supplied by means of burner apparatus generally designated 97, and which has the burner motor 20 which corresponds to the motor previously described and shown in Figure 1. The control system for the motor is substantially identical with that previously described. The resistor 45 and ammeter have been omitted in the illustration. For clearness, the same reference letters are used for the control systems in both figures of the drawing. Thermal means is arranged as in the first case to be affected by atmospheric conditions, for example outside the building. This thermal means is housed by the casing 4, as previously described, and is now referred to as the control station. Within the casing is the block 3, the heating element 21, the metal tube 6 carried by the block, the thermostatic element 7, the switch element 10 and the contacts 8 and 11. The thermostatic element 7 responds to the temperature at the control station and is adapted to simultaneously energize the heating means 20 and 21, when the temperature at the control station falls below a predetermined minimum, and is also adapted to deenergize these heating means when the temperature at the control station reaches a predetermined maximum.

In explanation of this phase of the invention, it is assumed that because of the difference in the amount of heat losses in the compartments (due to differences in location or exposure), the temperatures of respective compartments will differ. Room 90 may have a temperature of sixty, room 91 sixty-five, room 92 seventy-five and room 93 eighty degrees. It is obvious that this may be so, because the rooms 90—91 being at the top, near the roof, have greater heat losses, and rooms 92—93 may be located on the north side of the building so that they have certain different heat losses due, for example, to wind. An average of the temperature of this group of rooms gives, in this instance, a temperature of 70° which no single compartment has. However, it is desirable to operate the heating plant so that sufficient steam is generated to maintain this average temperature in each room of the group. It is evident that a proper control for the group cannot be had by a thermostat placed in any one of the rooms, nor by a number of thermostats one in each room.

In further explanation, it should be noted that others have attempted to control the heat supply so as to maintain some average temperature. In one system, the average temperature of the various compartments is taken, for example, by placing a thermal couple in each compartment, averaging the electric current set up, and then controlling the heat supply according to the average. In another system, air is withdrawn from each of the compartments and mixed and then used to control a thermostat which, in turn, controls the heat supply. These are all expensive and intricate devices, which are unnecessary in the present system. The control station 4 may be exposed to temperature outside the apartment building, and this station may be considered as another compartment, or house, which is to be heated. The weather conditions which affect the control station 4 also affect the group of compartments as a whole, so that the compartments, as a group, will have a heat loss which is proportionate to the heat loss at the station 4. Having determined the proportionate heat losses of the control station and of the compartments as a group, it will be necessary to supply a proportionate amount of heat to the compartments as a group, and to the control station. For example, suppose that the control station when maintained at an inside temperature of 70° has a heat loss of 100 B. t. u. per hour, and that the compartments as a group have a loss of 5000 B. t. u. per hour, when the average temperature in the compartments is 70°. It will then be necessary to supply 100 B. t. u. per hour to the control station and 5000 B. t. u. per hour to the compartments as a group. Therefore, heating means 21 will be so constructed as to deliver 100 B. t. u. per hour and the heating means 96 (20) will be so constructed as to deliver 5000 B. t. u. per hour. These examples correspond to the lowest expected outside temperature, and, of course, may be varied according to the conditions under which the apparatus is used.

On fluctuation of outside temperature, the thermostat 7 calls for heat at intervals, and in a manner to operate the heating means 20 often enough and over sufficiently long periods to maintain the inside temperature of the control station at 70°. The heater 96 will be operated similarly and should supply enough heat to maintain the average temperature of the compartments at 70°.

It is to be noted that it is unnecessary to provide separate heating means for the control station and the group of compartments because the heater might be so designed as to be capable of producing 5100 B. t. u. per hour under maximum operating conditions and 100 B. t. u. could be by-passed to the control station, by suitable proportioning of the radiation.

I claim as my invention:

1. A weather integrator comprising a thermostatic element and means to protect said thermostatic element from the weather and to modify the action of said thermostatic element due to the effect of radiant heat from the sun's rays, said means comprising a metal housing sufficiently thick to absorb radiant heat from the sun's rays and to retain a portion of the heat thus absorbed which is proportional to the heating effect of the sun's rays and to transfer said portion to said thermostatic element to modify the action thereof so as to compensate for the effect of sunlight and to dissipate the balance of the absorbed heat to the surrounding air.

2. A weather integrator comprising a thermostatic element, a housing therefor adapted to protect said element from the weather, said housing being adapted to absorb radiant heat from the sun's rays for modifying the action of said thermostatic element, and wind-operated means for further modifying the action of said thermostatic element.

3. In combination, temperature responsive means, and means responsive to wind velocity adapted to modify the operation of said first means.

4. In combination, temperature responsive means, means responsive to wind velocity adapted to modify the operation of said first means, and means responsive to the heat of the sun's rays to further modify the operation of said first means.

5. A control device to be affected by the surrounding atmosphere including temperature, wind and solar radiation, comprising a mass, a thermostat in close proximity to the mass to be affected by the temperature of the mass, means for heating the mass above the temperature of the surrounding atmosphere whereby the mass loses heat to the surrounding atmosphere, the rate of heat loss increasing as the wind velocity increases to modify the operation of the thermostat and the rate of heat loss decreasing as the mass absorbs radiant heat from the sun to also modify the operation of the thermostat.

6. A control device to be affected by the surrounding atmosphere including temperature, wind and solar radiation, comprising a mass, a thermostat in close proximity to the mass to be affected by the temperature of the mass, means for heating the mass above the temperature of the surrounding atmosphere whereby the mass loses heat to the surrounding atmosphere, the rate of heat loss increasing as the wind velocity increases to modify the operation of the thermostat and the rate of heat loss decreasing as the mass absorbs radiant heat from the sun to also modify the operation of the thermostat and means controlled by the thermostat for controlling the heating means to maintain the temperature affecting the thermostat substantially constant.

7. In combination, a plurality of switches, temperature responsive means for sequentially operating said switches, and means responsive to wind velocity adapted to modify the operation of the switches.

8. In combination, a plurality of switches, temperature responsive means for sequentially operating said switches, and means responsive to the combined effect of wind and sunlight adapted to modify the operation of the switches.

9. A control device to be affected by the surrounding atmosphere including temperature wind and solar radiation, comprising a mass, a thermostat in close proximity to the mass to be affected by the temperature of the mass, means operative upon the absorption of heat from the sun by the mass to modify the operation of the thermostat, and means operative upon the occurrence of wind to further modify the operation of the thermostat.

10. A control device to be affected by the surrounding atmosphere including temperature wind and solar radiation, comprising a mass, a thermostat in close proximity to the mass to be affected by the temperature of the mass, means operative upon the absorption of heat from the sun by the mass to modify the operation of the thermostat, and means operative upon the occurrence of wind to further modify the operation of the thermostat said last mentioned means including heating means for the mass.

11. A control device to be affected by the surrounding atmosphere including temperature wind and solar radiation, comprising a mass, a thermostat in close proximity to the mass to be affected by the temperature of the mass, means operative upon the absorption of heat from the sun by the mass to modify the operation of the thermostat, and means operative upon the occurrence of wind to further modify the operation of the thermostat said last mentioned means including heating means for the mass, and means controlled by the thermostat for controlling the heating means to maintain the temperature affecting the thermostat substantially constant.

12. A control device to be affected by the surrounding atmosphere including temperature wind and solar radiation, comprising a mass, a thermostat in close proximity to the mass to be affected by the temperature of the mass, means operative upon the absorption of heat from the sun by the mass to modify the operation of the thermostat, and means operative upon the occurrence of wind to further modify the operation of the thermostat said last mentioned means including temperature changing means for the mass.

13. A control device comprising, a housing of substantial mass, a thermostat in said housing responsive to the temperature therein, a plurality of switches operated by said thermostat, and temperature changing means for said housing controlled by said switches to maintain the temperature in said housing within predetermined limits.

DANIEL G. TAYLOR.